June 19, 1951 J. KOHUT, SR 2,557,605
MATERIAL TREATING APPARATUS HAVING
AIR CONDITIONING MEANS Filed April 16, 1948 3 Sheets-Sheet 1

Inventor
John Kohut, Sr.

By Alfred W. Vibber
His Attorney

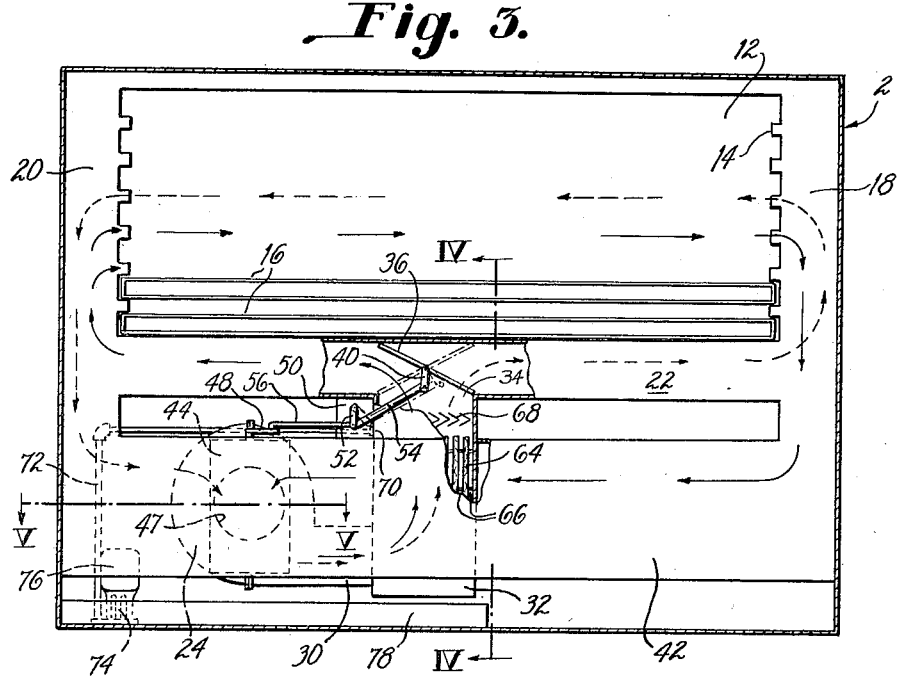

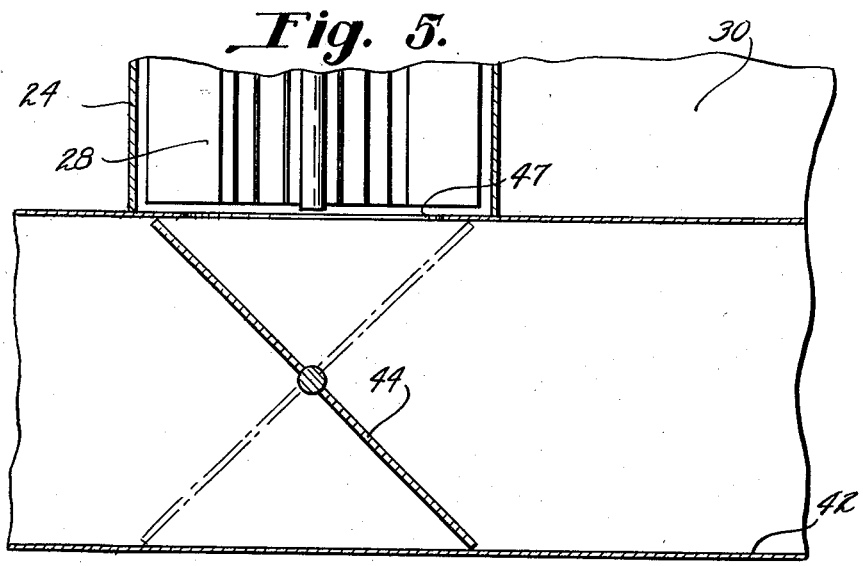
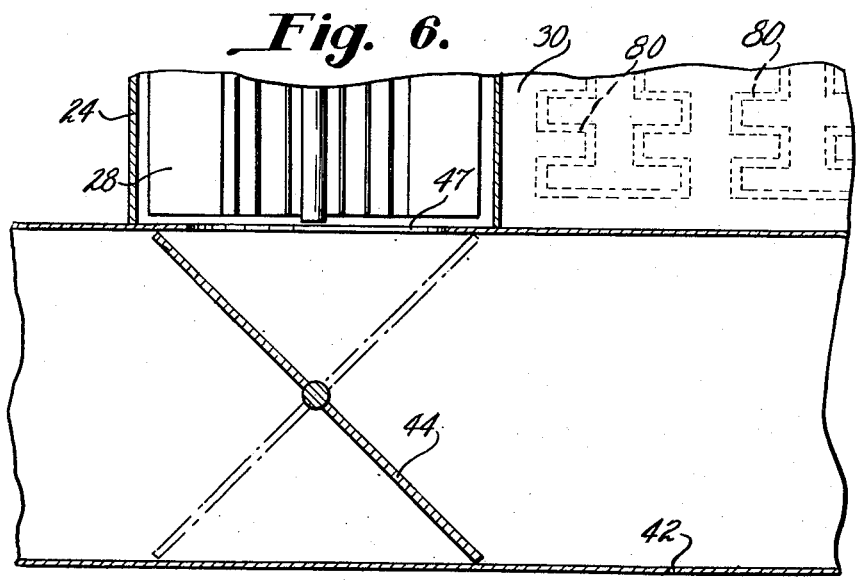

Patented June 19, 1951

2,557,605

UNITED STATES PATENT OFFICE 2,557,605

MATERIAL TREATING APPARATUS HAVING AIR CONDITIONING MEANS

John Kohut, Sr., Boonton, N. J.

Application April 16, 1948, Serial No. 21,362

2 Claims. (Cl. 34—53)

This invention relates to air conditioning equipment by means of which material may be treated to bring it to the correct moisture content.

The invention has among its objects the provision of an improved simplified apparatus for treating material whereby the moisture content thereof is brought to a desired value.

The invention has as a further object the provision of apparatus of the type indicated which adjusts the moisture content of material to be treated, which is distributed throughout a substantial volume in a substantially closed space, so that such material regardless of its location, is substantially uniformly treated.

These and further objects of the invention will be more readily apparent in the following description of preferred embodiments of air conditioning apparatus made in accordance with the invention. In the treating of hygroscopic material of which textiles are typical, to adjust their moisture content, there have been employed systems in which the material to be treated has been charged into a substantially closed space and has been subjected to a current of air having a predetermined moisture content, so that the hygroscopic material was moistened to the desired degree. Such prior apparatus was not altogether satisfactory, however, since, because of the one-way travel of the air past the hygroscopic material, moisture was rapidly abstracted therefrom by the first material with which it came into contact and the material distant from the air inlet was consequently but slowly adjusted in its moisture content. Consequently, in the batch system the material was treated in a manner which was markedly non-uniform, and it was necessary to treat the batch for an extended period of time to approach a condition in which the moisture content of the material was at all uniform throughout the treating space.

The apparatus of the present invention is designed to overcome such difficulties by providing means which periodically reverses the direction of the travel of the conditioned air through the material containing space, so that the material being treated is rapidly and substantially uniformly brought to the desired moisture content. Although the material to be treated by the apparatus of the invention has been referred to as hygroscopic, and moisture has been described as being added to the material, it is to be understood that the apparatus of the invention may be employed to adjust the surface moisture of the various materials which may be treated therein, including those which are non-hygroscopic, and that in accordance with an alternative apparatus within the invention, moisture may be removed from the material being treated.

The invention will be more readily understood by reference to the accompanying drawings in which:

Fig. 3 is a view in vertical section through the apparatus, the section being taken along the line III—III in Figure 4;

Fig. 4 is a view in transverse vertical section through the apparatus, the view being taken along the line IV—IV in Figure 3;

Fig. 5 is a fragmentary view in cross-section through a portion of the apparatus, the section being taken along the line V—V in Fig. 3; and Fig. 6 is a view in section similar to Fig. 5 of a portion of the apparatus, Fig. 6 showing an alternative structure of the apparatus, for drying materials to be treated therein.

Figure 1:
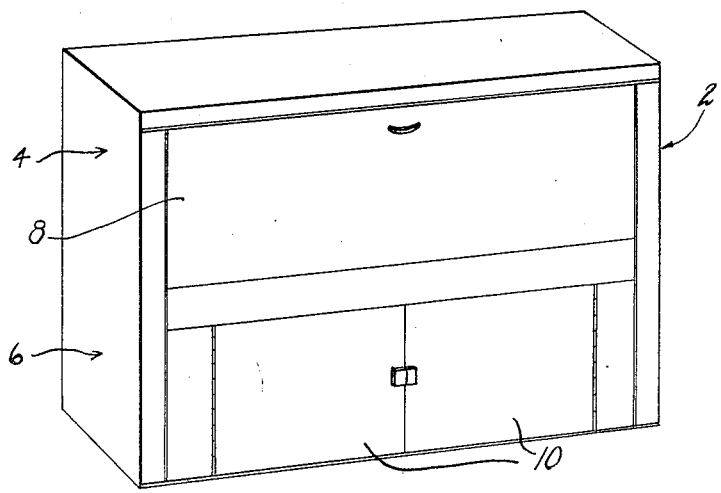
Fig. 1 is a view in perspective of a material treating cabinet made in accordance with the invention.

The apparatus shown in both the embodiments to be described takes the form of a cabinet for treating small textile articles, such as gloves, to add to their moisture content and prepare them for pressing. It is to be understood, however, that such embodiments are illustrative only, and that the cabinet and the mechanism associated therewith may be changed widely within the teaching of the invention. Such cabinet, generally designated 2, has a top, material treating, portion 4 and a bottom, mechanism containing, portion 6. The top portion 4 of the cabinet is provided with a vertically sliding door 8 through which the material to be treated is charged into the cabinet and, after being treated, removed therefrom. The bottom portion of the cabinet is provided with closures such as doors 10 through which access to the mechanism may be had.

The space 12 within the top portion 4 of the cabinet, which is closed off from the bottom portion 6, by a floor shown beneath the lowermost rack or tray 16, in Fig. 3, has provided therein the series of vertically spaced horizontal trays 16 supported at their ends, as shown, in the recesses provided in the corrugated sidewalls 14. Sidewalls 14 are spaced from the outer end walls of the cabinet so that there is provided at the left, in Fig. 3, a duct 20 and at the right (Fig. 3) a duct 18. Walls 14 are provided with a plurality of openings therethrough (not shown) over substantially their entire areas so that gas may pass therethrough from the duct 18 or 20, as the case may be, into space 12, as shown by the arrows.

Figure 2:
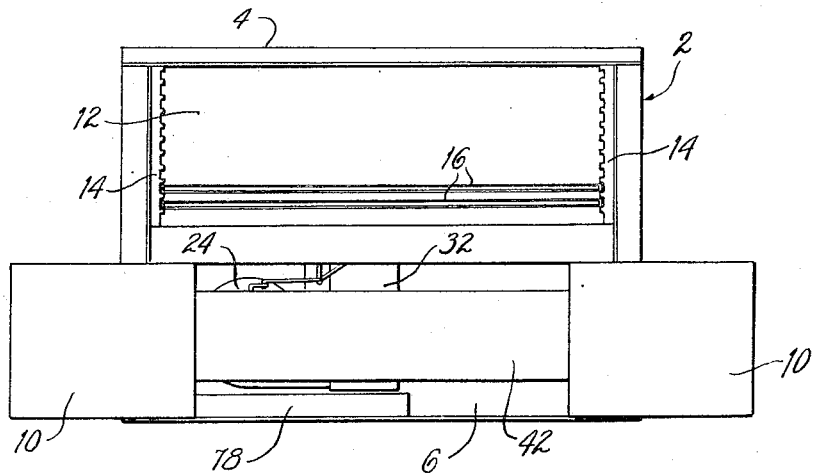
Fig. 2 is a view in front elevation of the cabinet, the door closing the top, material receiving, space being removed and the closures for the bottom of the cabinet being open.

Beneath the enclosed top 4 of the cabinet, there is the longitudinally disposed horizontal gas delivery duct 22 connected at one end to duct 18 and at the other to duct 20. Gas is delivered to duct 22 by a blower 24 driven by an electric motor 26, the motor being directly coupled to the barrel fan 28, as shown in Figs. 4 and 5. In the embodiment shown in Figs. 1–5, inclusive, the blower delivers gas, air in this case, to the delivery duct 30 which is connected to the bottom of the air conditioning unit 32. Unit 32 is designed to add a predetermined amount of moisture in finely divided form to the current of air passing upwardly therethrough. The air conditioning unit 32, the details of which form no part of this invention, may be, for example, either of the type described in my prior patent, No. 1,994,523, March 19, 1935, entitled Air Conditioning Device, or that shown and described in my pending patent application, Serial No. 622,854, filed October 17, 1945, now Patent No. 2,498,427, entitled Air Conditioning System, although it is a unit of the latter type which is shown here.

The upper end of unit 32 is connected to duct 22 at substantially the midpoint of the latter, as shown in Fig. 3. Positioned within duct 22 vertically above the opening 34, through which unit 32 connects with the duct, is a butterfly valve 36 pivotally mounted on horizontal trunnions 38. Valve 36 is of such dimensions that when it is positioned in the full line position shown in Fig. 3 it allows unit 32 to communicate with the left-hand end of duct 22 and shuts the right-hand end of the duct off from unit 32. When the valve is turned counter-clockwise to its dot and dash line position, it allows unit 32 to communicate with the right-hand end of duct 22 and shuts the left-hand end of duct 22 off from unit 32. One trunnion of the valve 36 is provided with a crank 40 by which the valve is oscillated from one position to the other by means subsequently to be described.

Within the bottom, mechanism containing, space 6 of the cabinet there is provided a longitudinally disposed gas return duct 42 which is somewhat larger in cross-section than duct 22. Duct 42 also is connected at its right-hand end in Fig. 3 with vertical duct 18 and at its left-hand end with vertical duct 20. Duct 42 is connected to the inlet of blower 24 through the opening 47. Positioned within duct 42 opposite opening 47 is a butterfly valve 44 journalled on the vertical trunnions 46. Valve 44 is of such dimensions that when it is in the full line position shown in Fig. 5, corresponding to the full line position of valve 36 in Fig. 3, it blocks communication between the blower and the left-hand end of duct 42 but allows return air from the right-hand end of the duct to enter the blower through opening 47. When valve 44 is turned counter-clockwise (Fig. 5) to the dot and dash line position shown in that figure, it blocks communication between the blower and the right-hand end of duct 42 and allows air to enter the blower from the space 12 by way of the left-hand end of duct 42. The dot and dash line position of valve 44 in Fig. 5 corresponds to the dot and dash line position of valve 36 in Fig. 3, that is, both valves are simultaneously moved to that position to effect reversal of flow of air from that existing when both valves are in their full line positions. Oscillation of valve 44 is effected by means of the crank 48 connected to the upper trunnion of the valve.

Simultaneous oscillation of both valves 36 and 44 is effected by means of the control device 50, which may be in the nature of the conventional furnace damper control mechanism, such device being provided with a crank arm 52 which is driven, by means not shown, to oscillate from the position shown in full lines in Fig. 3 to that shown in dot and dash lines in that figure. Crank 52 is connected to crank 40 by means of link 54 and to crank 48 by means of link 56. Control device 50 is operated to change the position of the valves periodically by means of the governor switch mechanism shown generally at 58. Such switch mechanism is driven off motor 26 by means such as the worm 60 and a worm gear (not shown) meshing therewith so as periodically to make and break the supply circuit through such switch to device 50. As an example of a typical time cycle to which the switching device may be set, in the conditioning of gloves by the apparatus shown switch 58 may be driven at such speed that the position of valves 36 and 44 and thus the direction of travel of air in space 12 are reversed every thirty seconds.

In the embodiment shown, the unit 32 is of the type shown in Patent No. 2,498,427. Air from the blower, entering the unit from delivery duct 30, passes upwardly through the plurality of vertically disposed reticular diaphragms 64 which extend through and are spaced and supported by a plurality of spaced horizontal baffles 66. Diaphragms 64 are kept moist by means of a water spray produced by liquid nozzle 70, which is supplied with water from reservoir 78 through the medium of pump 74, which is driven by motor 76, and delivery pipe 72. Excess water is returned to reservoir 78 from the bottom of unit 32 by means not shown. The conditioned air upon rising from the top of diaphragms 64, passes through the droplet eliminator 68 and thence past valve 36 and into duct 22.

As a consequence of the reversal of flow of conditioned gas through the material receiving closure, the material to be treated, regardless of its location therein, is subjected to a substantially uniform atmosphere, and is quickly brought substantially uniformly to a condition in which it contains the desired amount of moisture.

In some instances the material being treated is required to be dried rather than moistened. In this case the apparatus described may be modified, as shown in Fig. 6, to provide a heating means such as the electrical resistance heaters 80 in the delivery duct 30. When the apparatus is employed in a drying operation, unit 32, if it is incorporated in the apparatus, will serve only as a duct for the heated air, pump 74 being stopped so that no moisture is delivered thereto through nozzle 70. Alternatively, when the device is used exclusively for drying, unit 32 may be replaced by a simple vertical duct which connects duct 30 to duct 22 beneath valve 36 in the latter.

In some instances it is desired to preheat the air introduced to unit 32 while the latter is in operation to humidify the material being treated. In this case, heating units such as heaters 80 may be incorporated in the apparatus of the embodiment of the apparatus shown in Figs. 3, 4, and 5, the heating unit being operated at a lower intensity than is usual in drying operations, the effect of the heater and of unit 32 being to warm the material being treated and to raise its moisture content.

Although I have shown and described preferred embodiments of the air conditioning equipment of my invention, it is to be understood that the described embodiments are illustrative only and that the invention is capable of considerable variation as to details.

I claim as new the following:

1. Apparatus for adding moisture to material comprising a cabinet forming a substantially closed space, a material receiving structure located in the top of such cabinet, said structure being generally symmetrically located longitudinally of the space within the cabinet, the structure having foraminous, generally vertical, end walls spaced from opposite walls of the cabinet and forming therewith vertical ducts, the other walls of the structure being generally imperforate, and means in the cabinet below the material receiving structure for supplying conditioned air under pressure periodically to each of the vertical ducts and for discharging air from the other of such vertical ducts after the air has passed over and through the material in the material receiving structure, said last named means comprising a first supply duct located immediately adjacent the material receiving structure, opposite ends of said first supply duct communicating with the lower ends of the vertical ducts, a second, return, duct located parallel to the first horizontal duct, the last two named ducts being connected at their juxtaposed ends, a blower, the blower having an intake duct communicating with the return duct intermediate the ends of the latter, the blower having a delivery duct, an air conditioning means connected to the blower delivery duct, the air conditioning means being so constructed and arranged as to add a predetermined amount of moisture to the air delivered thereto by the blower, the air conditioning means having an air exhaust duct, said exhaust duct being connected to the supply duct intermediate the ends of the latter, a first reversible valve positioned in the supply duct and cooperating with the exhaust duct of the air conditioning means selectively to direct conditioned air in either direction in the supply duct, a second reversible valve positioned in the return duct and cooperating with the air intake duct of the blower to direct the air selectively into the blower from either end of the return duct, means interconnecting the two valves so that they operate in unison and selectively occupy operating positions such that the air intake ducts of the blower receives air from that end of the return duct opposite from that end of the supply duct to which conditioned air is directed, and means for periodically reversing the positions of the valves.

2. Apparatus for adding moisture to material comprising a cabinet generally in the form of a rectangular parallelopiped forming a substantially closed space, a material receiving structure located in the top of such cabinet, said structure being symmetrically located longitudinally of the space within the cabinet, the structure having foraminous, generaly vertical, end walls spaced from opposite walls of the cabinet and forming therewith vertical ducts, the other walls of the structure being generally imperforate, and means in the cabinet below the material receiving structure for supplying conditioned air under pressure periodically to each of the vertical ducts and for discharging air from the other of such vertical ducts after the air has passed over and through the material in the material receiving structure, said last named means comprising a first, horizontal, duct located immediately below the material receiving structure, opposite ends of said first horizontal duct communicating with the lower ends of the vertical ducts, a second, horizontal, duct located below the first horizontal duct and parallel thereto, the horizontal ducts being connected at their juxtaposed ends, a blower, the blower having an intake duct communicating with the lower horizontal duct intermediate the ends of the latter, the blower having a delivery duct, an air conditioning means connected to the blower delivery duct, the air conditioning means being so constructed and arranged as to add a predetermined amount of moisture to the air delivered thereto by the blower, the air conditioning means having an air exhaust duct, said exhaust duct being connected to the first horizontal duct intermediate the ends of the latter, a first reversible valve positioned in the first horizontal duct and cooperating with the exhaust duct of the air conditioning means selectively to direct conditioned air in either direction in the first horizontal duct, a second reversible valve positioned in the second horizontal duct and cooperating with the air intake duct of the blower to direct air selectively into the blower from either end of the second horizontal duct, means interconnecting the two valves so that they operate in unison and selectively occupy operating positions such that the air intake duct of the blower receives air from that end of the second horizontal duct opposite from that end of the first horizontal duct to which conditioned air is directed, and means for periodically reversing the positions of the valves.

JOHN KOHUT, Sr.

REFERENCES CITED

The following references are of record in the file of this patent:

UNITED STATES PATENTS

| Number | Name | Date |
| --- | --- | --- |
| 763,387 | Gathman | June 28, 1904 |
| 887,317 | Duryea | May 12, 1908 |
| 1,074,485 | Ballard | Sept. 30, 1913 |
| 1,173,171 | Casey et al. | Feb. 29, 1916 |
| 1,229,397 | Austin | June 12, 1917 |
| 1,619,765 | Ridley | Mar. 1, 1927 |
| 2,201,389 | De Give | May 21, 1940 |
| 2,340,633 | Wigelsworth | Feb. 1, 1944 |
| 2,347,601 | Jackson | Apr. 25, 1944 |